United States Patent [19]
Kelley

[11] Patent Number: 6,012,349
[45] Date of Patent: Jan. 11, 2000

[54] COMPATIBLE POLYMERIC MEANS FOR COMMUNICATING POWER AND MOTION

[75] Inventor: John Wilbur Kelley, Houston, Tex.

[73] Assignee: Shell Oil Company, Houston, Tex.

[21] Appl. No.: 08/310,592

[22] Filed: Sep. 22, 1994

[51] Int. Cl.[7] ........................................ F16H 1/12
[52] U.S. Cl. .................................. 74/421 R; 74/DIG. 10
[58] Field of Search ........................... 74/421 R, DIG. 10

[56] References Cited

U.S. PATENT DOCUMENTS

| | | | |
|---|---|---|---|
| H988 | 11/1991 | Gergen et al. | 525/179 |
| H1021 | 2/1992 | Machado et al. | 524/494 |
| 4,037,483 | 7/1977 | Nadal | 74/DIG. 10 |
| 5,122,564 | 6/1992 | George . | |
| 5,141,979 | 8/1992 | George et al. | 524/398 |
| 5,194,031 | 3/1993 | Sahler | 74/421 R |
| 5,242,966 | 9/1993 | Kastelic et al. | 524/379 |
| 5,256,335 | 10/1993 | Byrd et al. . | |
| 5,306,772 | 4/1994 | Mimura et al. . | |
| 5,423,232 | 6/1995 | Miller et al. | 74/421 R |

*Primary Examiner*—Tamara L. Graysay
*Assistant Examiner*—David Fenstermacher
*Attorney, Agent, or Firm*—Todd F. Volyn

[57] ABSTRACT

A system for transmitting power and motion is presented in which at least one component for transmitting power and motion communicates power and motion to another component in which two means are articles of polyketone polymer. In one aspect of the invention the component for transmitting power and motion are spur gears. In another aspect of the invention at least one of the component for transmitting power and motion includes worm gearing.

6 Claims, 5 Drawing Sheets

COMPATIBLE POLYMERIC MEANS FOR COMMUNICATING POWER AND MOTION

FIELD OF THE INVENTION

This invention is related to the communication of power and motion.

BACKGROUND OF THE INVENTION

Gears, belt chains, plane and roller bearings, linear bearings, sleeve bearings, pulleys, sliding plates and other similar devices have long been used to transmit, communicate, or facilitate motion and power in mechanical devices. Materials that are useful in such applications must be resilient and tough to withstand the dynamic application of force and repetitive strain. It is also desirable that such materials be amenable to machining or processing. This is particularly true in the case of precision applications such as the manufacture of gears for instrumentation. The tribological properties of the material are of further and perhaps more important consideration.

Using the gear as an example of such devices, failure can result when the material cannot properly hold a tolerance, from the inability to withstand the torsional stresses of start-up and shut-down, and from cyclical fatigue. These problems result in a failure of the tooth from excessive wear which can be compounded by plastic flow or creep due to thermal softening. Additionally, tooth bending fatigue, contact fatigue (pitting and spalling), thermal fatigue, tooth bending impact, tooth shear, tooth clipping, case crushing, torsional shear, and stress ruptures have similar impact. The role of material selection and preparation thus clearly have much to do with the successful design of a motion and power transmission strategy.

Metals such as steel, bronze, and aluminum alloys have been successfully used in a wide variety of such applications. However, the use of nonmetal engineering materials such as polymers has greatly improved noise reduction, vibration damping, and economics in many cases. Unfortunately, using a polymeric power or motion transmitting means such as a gear is not without its drawbacks. Low heat resistance, large thermal deformation, large shrinkage upon processing, and mediocre mechanical strength have precluded the use of numerous thermoplastics, thermosets, and resins from serious consideration in demanding applications.

It is a general practice in the art not to communicate power and motion from one such polymeric article to another of similar composition. This is particularly true where the stress on the article is significant. Polyacetal and Nylon 66 are typical materials used in gearing arrangements and other similar applications where nonmetals are used. One will often find, for example, a polyacetal pinion and a nylon spur gear in communication with one another. However, in most nontrivial translations of power and motion, one will rarely find combinations involving similar materials as such combinations generally result in disappointing wear factors. Of course, finding the right combination of materials to use together and sourcing such dissimilar materials creates economic inefficiencies and other problems.

While these considerations clearly apply to the structure and manufacture of gears, it should also be borne in mind that almost any device used to transmit, communicate, or facilitate power and motion necessarily involves similar concerns. For example, cams are generally used to communicate motion and power by means of a connection between an edge (or a groove therein) or surface and a follower. In addition to repetitive/cyclic movement and imposition of force acting on both cam and follower, these mechanisms are often designed to incorporate large accelerations. Thus, the use of materials which cannot hold a tolerance (e.g., through loss of material) or which are not amenable to precision processing or manufacture can easily result in wildly eccentric motion and, ultimately, failure. It is therefore important to employ materials which can be worked to precision, which function well when placed in communication with each other, and which can withstand repetitive/cyclic movement and impact.

The same can be said of bearings with rolling or sliding contact. The repetitive and cyclic facilitation of motion inevitably raises concerns analogous to those of gears and cams. Indeed, one skilled in the art will readily appreciate that from a materials perspective, an improvement in a means for transmitting power and motion is generally applicable to all means of power and motion transmission.

Rolling contact and sliding contact are manifested in most power and motion gear applications. Rolling contact predominates in motion and power transmission when such applications are between parallel shafts or between intersecting shafts. When non-parallel and non-intersecting shafts are employed, sliding contact predominates. Thus, materials useful in power and motion transmission between all shaft setups exhibit both good wear and good strength.

Polyketones have heretofore not been used commercially in such applications. These polymers of carbon monoxide and olefins are now well known in the art. They are disclosed in numerous patents assigned to Shell Oil Company which are exemplified by U.S. Pat. No. 4,880,865 and U.S. Pat. No. 4,818,811 which are herein incorporated by reference. The introduction of power and motion translating means which could further improve the utility and economics of machine design and manufacture as well as the performance of existing designs would be welcome. Accordingly, this is an object of the invention.

SUMMARY OF THE INVENTION

A system for translating power and motion is presented in which at least one means for transmitting power and motion comprising a polyketone polymer communicates motion to another such means comprising a polyketone polymer.

In one aspect of the invention motion and power are transmitted between parallel shafts.

In another aspect of the invention motion and power are transmitted between intersecting shafts.

In yet another aspect of the invention the means for transmitting power and motion are spur gears.

In yet a further aspect of the invention motion and power are transmitted between non-parallel and non-intersecting shafts.

In yet another aspect of the invention the means for transmitting power and motion includes worm gearing.

DETAILED DESCRIPTION OF THE INVENTION

Figure 1:
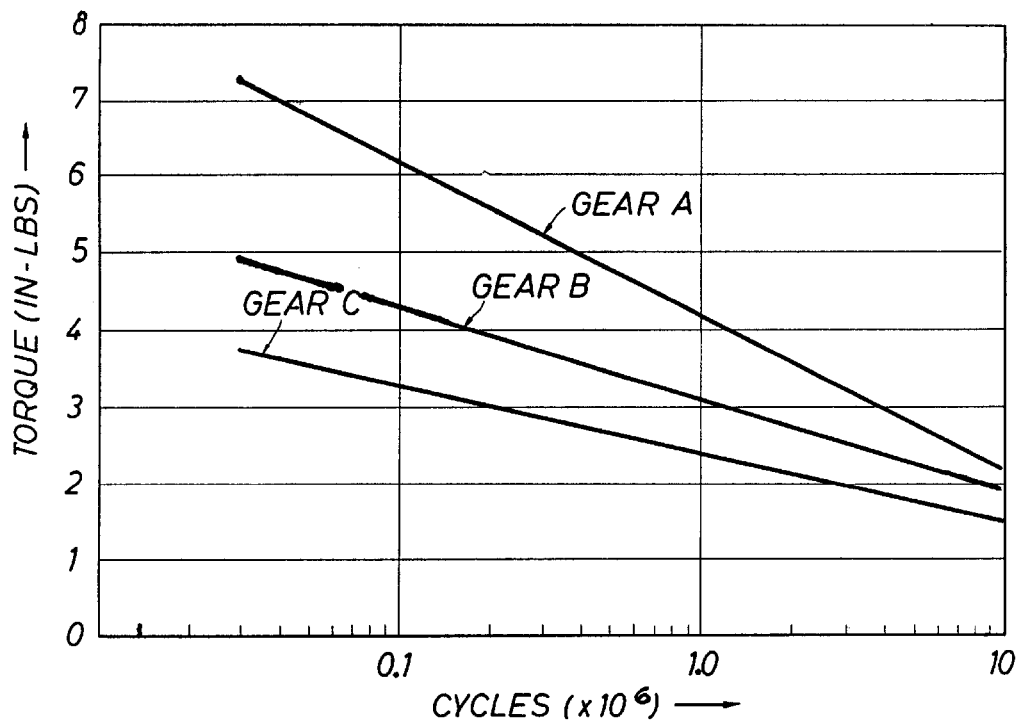
FIG. 1 is a graphical representation of comparative data produced according to Example 1.
Figure 2A:
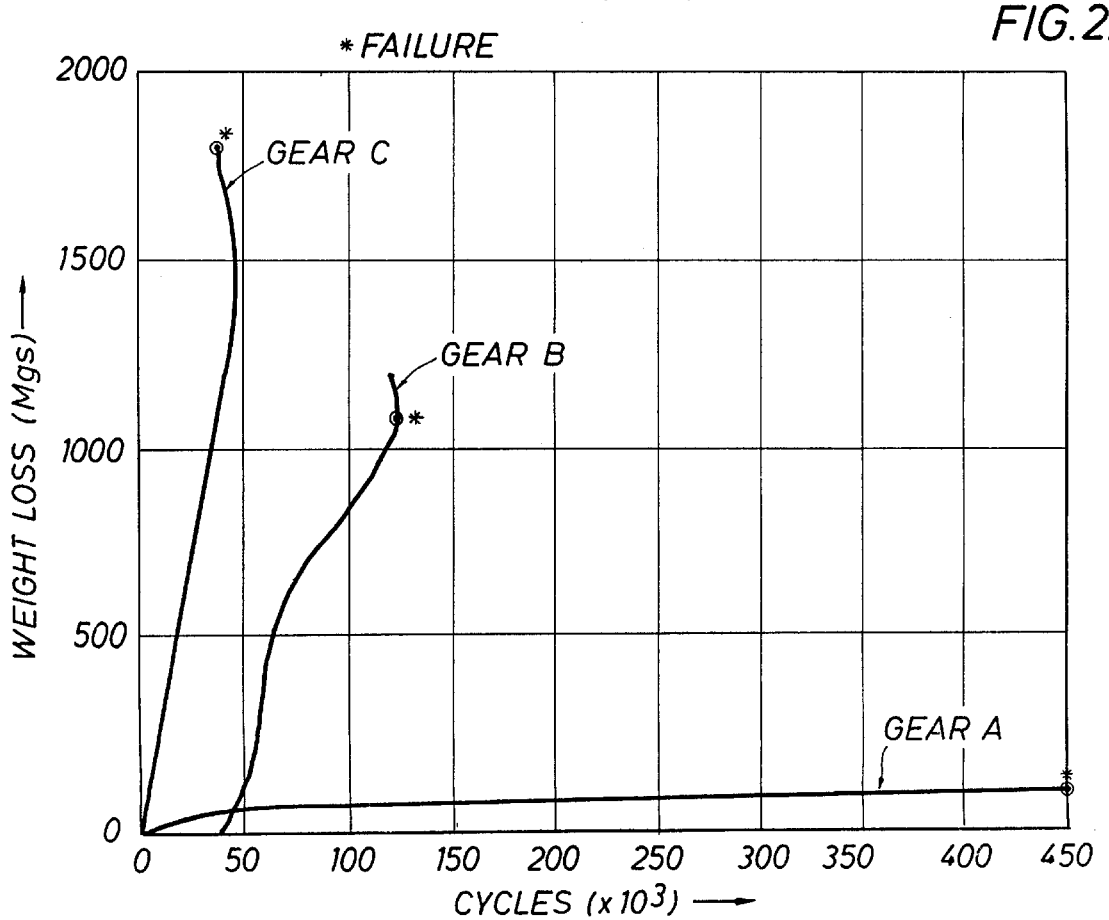
FIG. 2a is a graphical representation of comparative data produced according to Example 2.
Figure 2B:
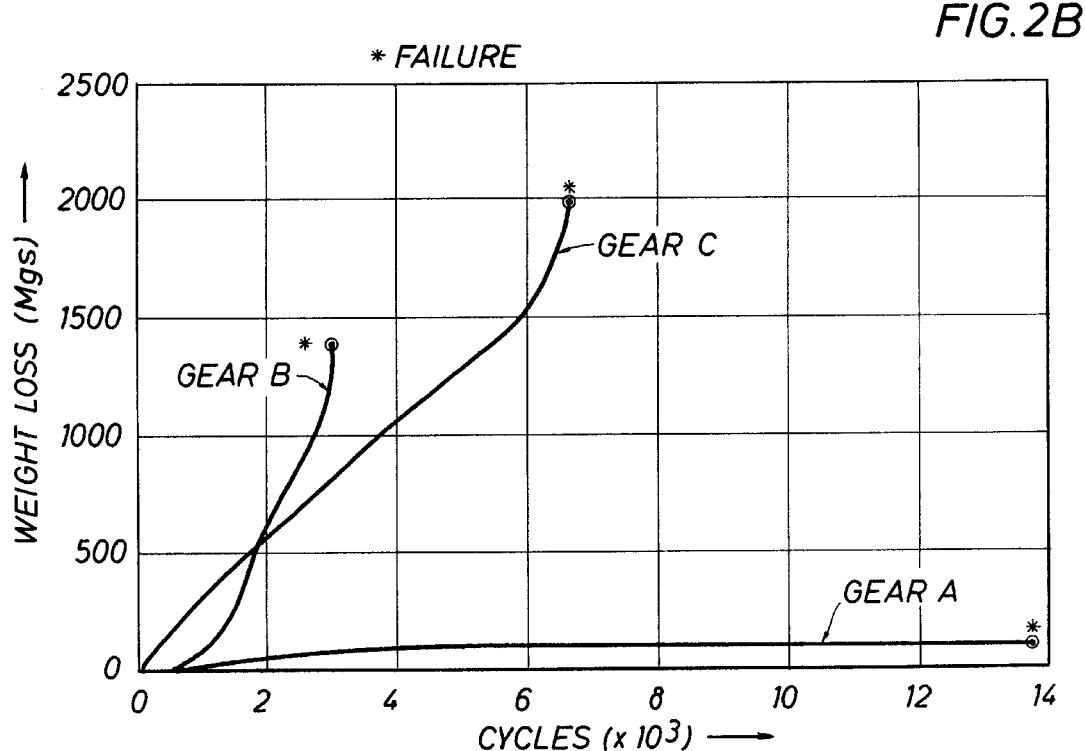
FIG. 2b is a graphical representation of comparative data produced according to Example 2.
Figure 3:
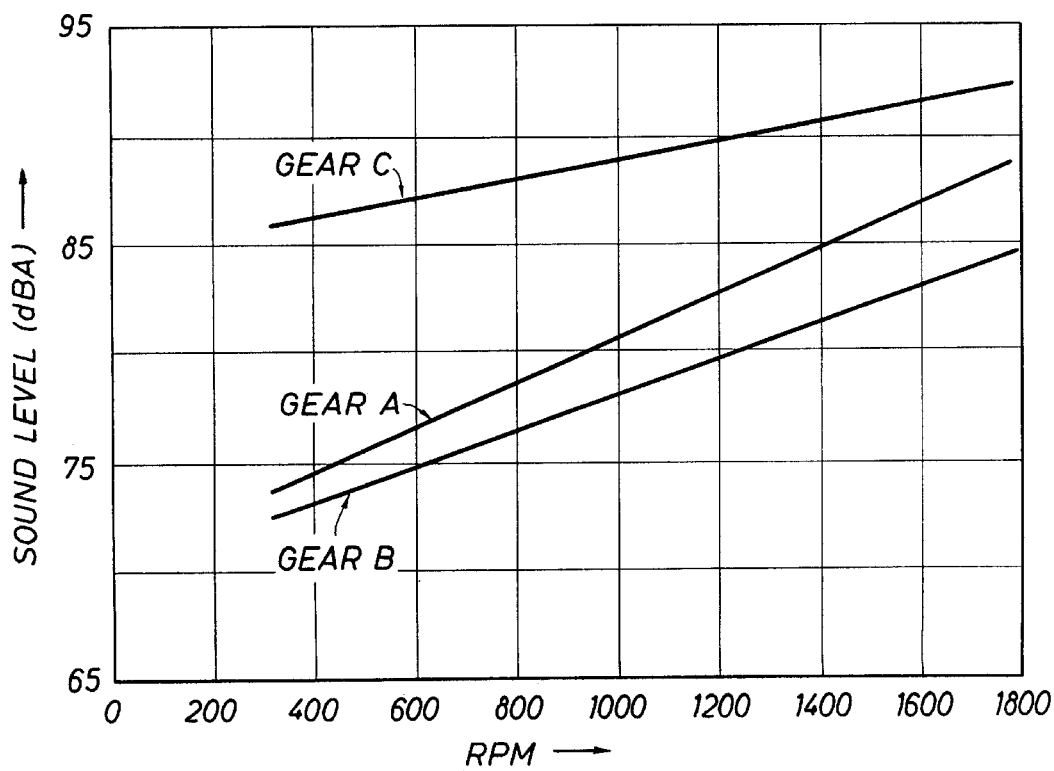
FIG. 3 is a graphical representation of comparative data produced according to Example 3.
Figure 4:
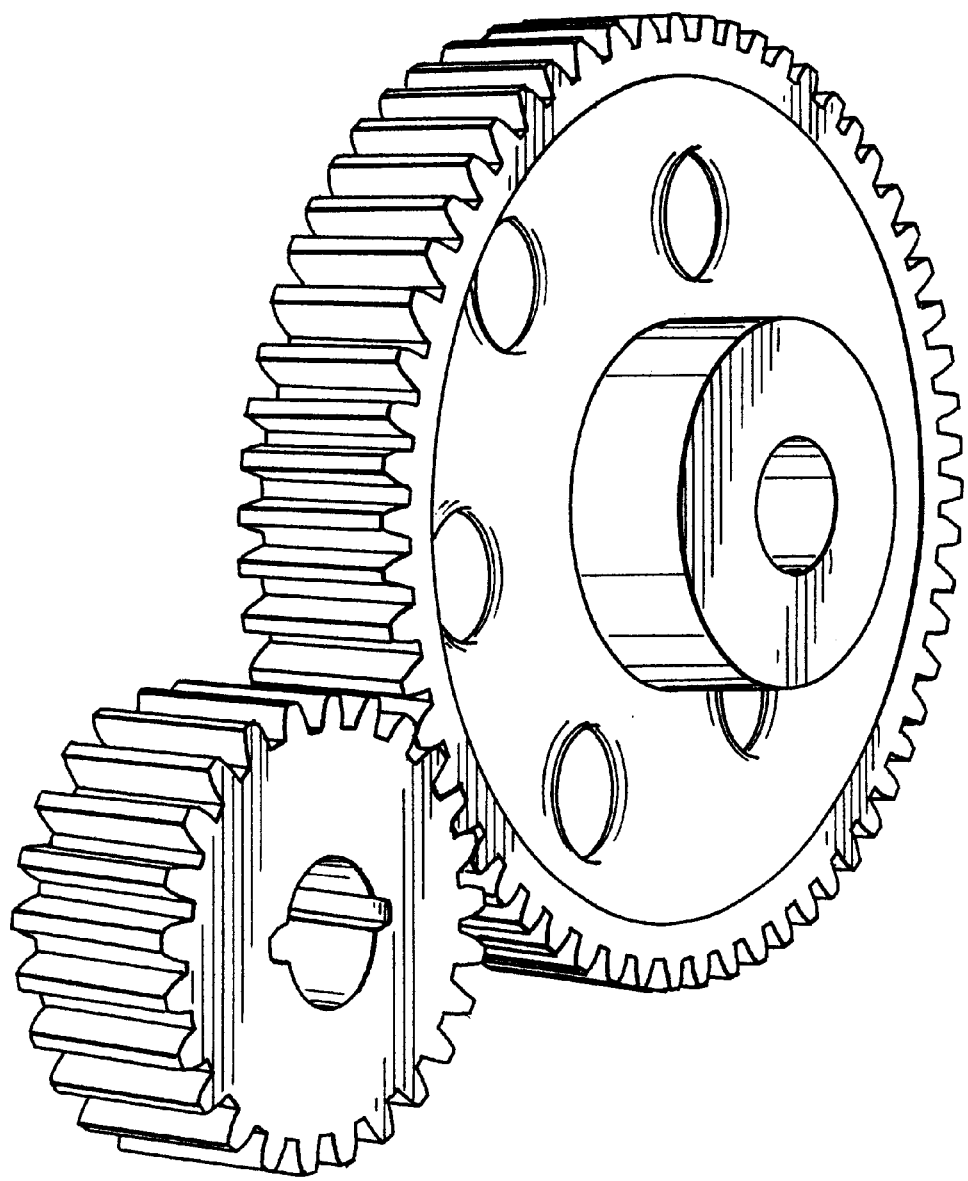
FIG. 4 is a depiction of gears according to the invention.
Figure 5:
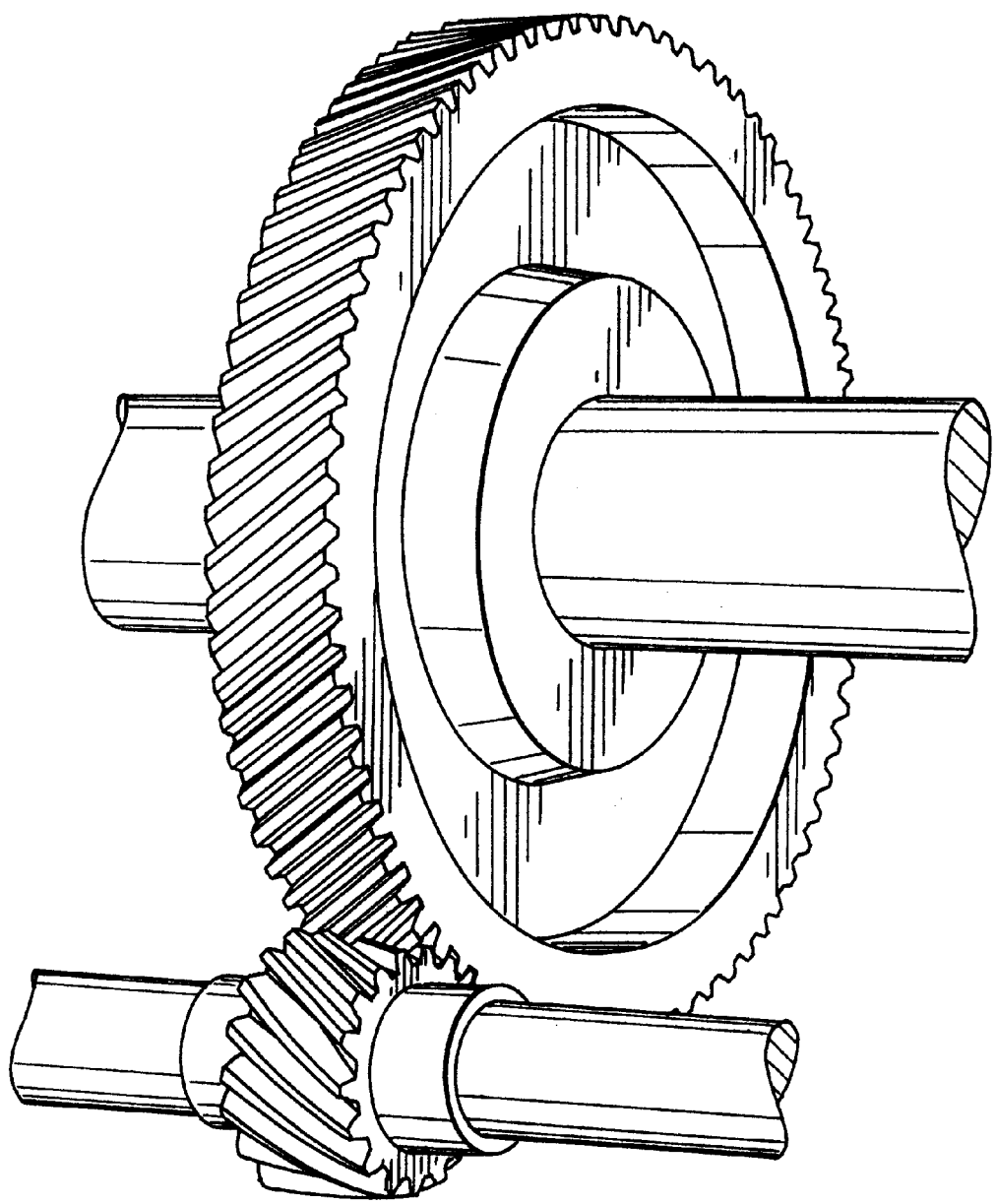
FIG. 5 is a depiction of gears having parallel shafts according to the invention.
Figure 6:
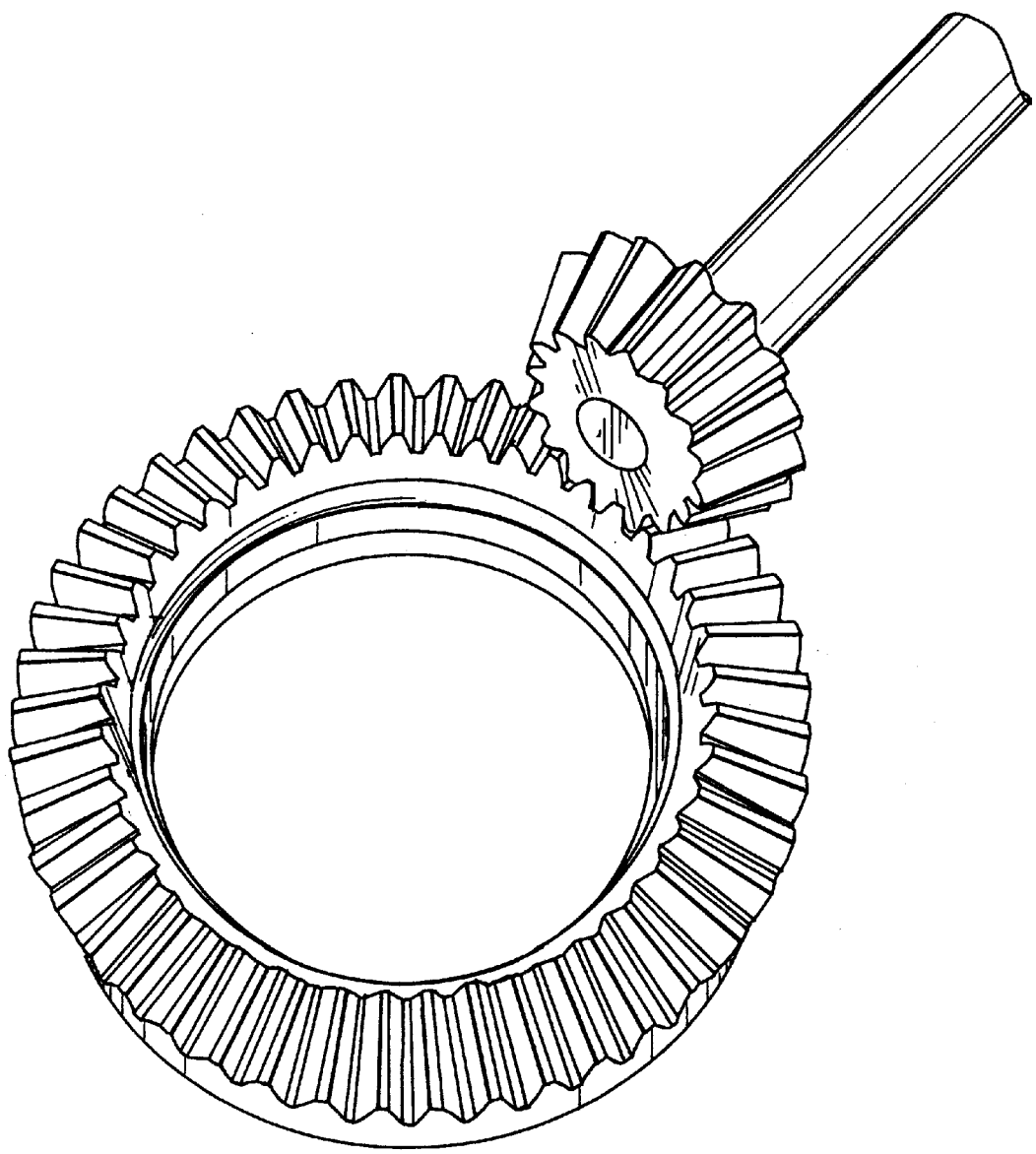
FIG. 6 is a depiction of gears having intersecting shafts according to the invention.

This invention is practiced by fabricating means for transmitting power and motion from polyketone polymers and using combinations of such means in the communication or facilitation of motion and power. As used throughout this specification, the transmission of motion and power includes the translation, communication or facilitation of power and motion.

The means for transmitting power and motion made according to this invention exhibit mechanical strength, wear resistance, and resistance to heat and thermal deformation. They also show very little shrinkage upon molding and processing which makes them suitable for miniaturization and expansion. When such means comprise gears, the gears have been found to have tooth strength and wear resistance so that they are capable of bearing torques for power and motion transmission.

In the embodiment of this invention comprising a system of gears, it has further been found that the low mold shrinkage that is attainable when such gears are, for example, injection molded results in excellent tooth quality. That is, there is very little error in single pitch, neighboring pitch, accumulating pitch, etc. Thus, not only are spur gears successfully made according to this invention, but so too are cylindrical gears, helical gears, double helical gears, straight bevel gears, spiral bevel gears, zerol bevel gears, crossed helical gears, hypoid gears, worm gears, multithread worm gears, and other gears in which the intermeshing pitch circle is not on the same plane as the direction in which the force is transmitted or their pitch helix is not parallel to the axial direction of the cylinder.

Suitable means for transmitting motion and power include gears, belts, chain and sprocket assemblies, plane and roller bearings, linear bearings, sleeve bearings, pulleys, sliding plates and other like mechanisms. Preferred means are gears. Most preferred means are spur gears. The means for transmitting or communicating power and motion or facilitating the same can readily be used in conjunction with like means. For example, one can comprise a system of pinion and spur gears for transmitting motion and power wherein both are comprised of polyketone polymer. Tooth strength, tooth wear, and all other measurable parameters of transmission efficacy are well suited to protracted periods of movement and communication without adverse impact. Likewise, a system for transmitting power and motion using, for example, a worm gear can be suitably fabricated from like polyketone polymers in all of its components.

It is this aspect of the invention comprising a system of means for transmitting power and motion in which two such means are in direct communication with each other that is most extraordinary. As demonstrated in the examples, such systems have been found capable of transmitting power and motion up to the point of the mechanical failure of the means. Thus, for example, when the system comprises two or more spur gears fabricated from polyketone, the gears will communicate motion and power until gear teeth break. This is atypical of polymeric gear systems which typically fail to communicate motion and power well before such breakage occurs. Rather, such systems of the prior art generally exhibit tooth wear until each tooth of one gear slips past the teeth of the gear with which it is to communicate.

These systems can be assembled in a wide variety of ways. Polyketone spur gears placed in communication with polyketone pinions are one example. Bevel gear systems wherein both contacting members are comprised of polyketone are another. Planetary gear systems completely fabricated from polyketones are now possible as are polyketone cam and follower assemblies. One skilled in the art will readily recognize that such systems for the transmission of power and motion comprise a very large class of mechanisms.

Such systems greatly improve the economics of machine fabrication. This is particularly true in applications where polymeric components would be desirable but nontrivial forces must be borne by the mechanisms and multiple material processing adds undue complexity and cost. With systems according to this invention, a single polymer (polyketone) may be used to fabricate all components bearing force. Such applications could include, for example, mechanisms to drive automotive accessories (such as power windows, seats, and antennas), platforms to drive office equipment (such as printers, plotters, and copiers), and mechanisms to drive appliances.

The materials useful in the practice of this invention include a linear alternating polymer of carbon monoxide and at least one ethylenically unsaturated hydrocarbon and other common polymer additives. As used throughout this specification, such polymers are referred to simply as polyketones or polyketone polymers. Fillers, extenders, lubricants, pigments, plasticizers, and other polymeric materials can be added to the compositions to improve or otherwise alter the properties of the composition.

The polyketone polymers which are employed as the major component of the polymer composition useful in this invention are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of this invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

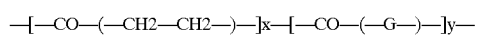

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —[—CO—(—CH2—CH2—)— units and the —CO—(—G—)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Polyketone polymers of number average molecular weight from about 1000 to about 200,000, particularly those of number average molecular weight from about to about 90,000 as determined by gel permeation chromatography are of particular interest in the practice of this invention. The physical properties of the polymer will depend in part upon the molecular weight, whether the polymer is a copolymer of a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g.

Preferred methods for the production of the polyketone polymers are illustrated by U.S. Pat. Nos. 4,808,699 and 4,868,282 to van Broekhaven, et al which issued on Feb.28, 1989 and Sep. 19, 1989 respectively and are incorporated herein by reference. U.S. Pat. No. 4,808,699 teaches the production of linear alternating polymers by contacting ethylene and carbon monoxide in the presence of a catalyst comprising a Group VII metal compound, an anion of a nonhydrohalogenic acid with a pKa less than 6 and a bidentate phosphorous, arsenic or antimony ligand. U.S. Pat. No. 4,868,282 teaches the use of a similar catalyst in the production of linear random terpolymers by contacting carbon monoxide and ethylene in the presence of one or more hydrocarbons having an olefinically unsaturated group.

Lubricity is a helpful feature of some polymers useful in the manufacture of power and motion transmission means. The polyketones of this invention exhibit good lubricity which may be further enhanced through the addition of lubricants, processing aids, and other additives.

The resulting polyketones can be processed by conventional methods such as extrusion and injection molding into various means for transmitting power and motion.

One skilled in the art of polymer science will readily appreciate that any number of molding methods may easily be used for this purpose. U.S. Pat. No. 5,307,705 which is incorporated herein by reference describes one such process. Moreover, one can readily fabricate gears and other transmission means by molding or extruding polyketone stock and then machining or cutting the gear or other means as is commonly done in the case of metals.

The invention is further illustrated by the following non-limiting examples.

EXAMPLES

In each of the examples, neat polymer was processed to fabricate spur gears. Two different types of polyketone polymer were used: a polyketone homopolymer formed from ethylene and carbon monoxide was used to fabricate one set of polyketone gears and a polyketone copolymer formed from ethylene, carbon monoxide, and propylene was used to fabricate another. In each example it was found that both sets of polyketone gears performed substantially identically. Thus, results for both sets of polyketone gears are reported as Gear A. A nylon 6,6 Polyamide polymer composition sold under the tradename "Zytel 101" by E.I. du Pont de Nemours & Co. was used to fabricate Gear B and an acetal alternatively referred to as polyoxymethylene polymercopolymer sold under the tradename "Celcon M90" by Hoechst Celanese Corporation was used to fabricate Gear C.

Spur Gear mold inserts obtained from ABA PGT Inc. of Manchester, Connecticut were modified so that the resulting gears would be of two varieties: a 33 tooth gear (33T), and a 34 tooth gear (34T). Polyketone polymers were injection molded without the use of processing aids or additives. Acetal and nylon gears were injection molded with the inclusion of processing aids and additives as sold with the polymer in its pelletized form. Each polymer used to produce a given size gear was processed through the same mold (e.g., all 34T gears were made from the same mold, etc.). Results were averaged for all gears of a given type. For example, results reported for weight loss for Gear A is the average weight loss for 33T and 34T tested as a meshing pair. In each case, the gears were formed to have an involute geometry with tip and root relief. Each of the 33T and 34T gears had a diametral pitch of 12 and theoretical pitch diameters of 2.83 inches and 2.75 inches respectively.

In each example, each gear was tested without lubrication.

Example 1

(Gear Life)

Gears were affixed to a four-square gear tester having two shafts; a drive shaft connected to a variable speed motor and a torsion bar parallel to the drive shaft. One steel gear was affixed to each shaft which were then placed in communication with each other so that the motion of the drive shaft was transmitted to the torsion bar. At the end of the shafts opposite the motor, a gear made of polymer was affixed to each shaft; one a 33T and the other a 34T. The two polymer gears were placed in communication with each other. Thus, motion was also translated between the two polymer gears. A torquemeter was placed approximately midway along the drive shaft to measure and adjust the amount of torque placed on the system.

The four-square gear tester was run at 1200 revolutions per minute (RPM) giving a pitch line velocity of 865 ft./min. Torque was held constant throughout each run. Gear life was determined by running the tester under these conditions until torque could no longer be transferred from one polymeric gear to the other. Results are shown in Graph 1.

This example shows that polyketone gears endure torques for a much greater period of time (as measured by cycles of operation) than do commonly used polymeric gears. Further, it was found that gear tooth failure occurred in polyketone gears as a result of mechanical fatigue failures. Failures in the case of each of the other polymers occurred as a result of wear failures. This shows that, unlike most other polymeric gear systems, polyketone gear systems can be stressed to their mechanical limit without significant loss in tooth dimensions even when the gears in direct communication with each other are comprised of the same polymer.

Example 2

(Gear Wear/Weight Loss )

This example was conducted as set forth in Example 1 except that the four-square gear tester was periodically stopped so that gears could be disassembled and weighed. Material loss was taken as an indication of gear wear. Further, two different runs were conducted for each gear set: one run at a torque of 38 in-lbs and the other at 95 in-lbs. Results of the 38 in-lbs example are shown in Graph 2a. Results of the 95 in-lbs example are shown in Graph 2b.

This example shows that polyketone gear systems exhibited a level of wear far lower than that found in commonly used polymeric gear systems. It was also observed that failure occurred in the case of polyketone gear systems as a result of mechanical fatigue while other polymeric gear systems failed because of wear/material loss. That is, non-polyketone gear systems failed because excessive tooth wear resulted in slippage and the inability to continue transmitting motion and power while the polyketone gear system transmitted motion and power up to the point of tooth breakage. Moreover, the failure of polyketone gear systems occurred after approximately four times as many cycles of operation as those of the polyacetal and nylon gear systems.

Example 3

(Sound Level)

A noise isolation box was placed around the gears in the four-square tester used in each of the examples cited above. Two microphones were placed inside the box and were connected to Bruel and Kjaer model 2610 amplifiers and subsequently to a Nakamichi DMP 100 converter to convert analog signals to digital outputs. The outputs were then recorded on a Panasonic AG2400 VHS recorder. The recorded digital outputs were analyzed using a Bruel and Kjaer model 2032 FFT analyzer. Two separate analyses were conducted: 1) a narrow band analysis using a 16 Hz bandwidth in the frequency band of 0–1, 2800 Hz, and 2) an octave band analysis.

When recordings were made without the actuation of the gears, it was found that any noise generated outside of the box with a frequency greater than about 175 Hz would not affect noise measurements inside the box. Gear fabrication was the same as that of Example 1. The results shown in Graph 3 are from a run in which 50 in-lbs of torque were applied.

Example 4

(Pin-on-disk Sliding Contact )

A disk was machined from injection molded plaques of neat polyketone (Disk A) and acetal alternatively referred to as polyoxymethylene polymer homopolymer (Disk B) sold under the tradename "Delrin II 500" by E.I. du Pont de Nemours and Co. A stationary pin was machined from injection molded tensile specimens of the same materials. The disk and pin were then used in a standard pin-on-disk setup using standard geometries. Surfaces in sliding contact were not altered from the as-injected molded state by the machining.

The as-machined geometry of the pin was a square block of dimensions 0.394 inches on each edge. The machined disk was rotated at a rate yielding an average surface velocity of 49 ft/min over the annulus resulting from the pin contacting the disk during the rotation. The pin was pressed against the disk with a force yielding a bearing pressure of 725 lb/in$^2$. Table 1 shows the results obtained. The dynamic coefficient of friction (DCOF) and wear factors were determined with the wear factor being the average of both pin and disk.

The lower DCOF of the polyketone is indicative of higher lubricity. This, together with a wear factor two orders of magnitude lower than the acetal homopolymer shows that systems of polyketone means for transmitting motion and power in which sliding motion predominates are suitable while means made of other substances are not. Thus, such polyketone means include, for example, cams on plates, rotary bearings, and gear systems wherein power and motion is transmitted between non-parallel and non-intersecting shafts.

TABLE 1

| Polymer | Dynamic Coefficient of Friction | Wear Factor $10^{-10} \frac{in^3 \, min}{lb\text{-}ft\text{-}hr}$ |
|---|---|---|
| Disk A | .3 | .21 |
| Disk B | .4 | 21 |

I claim as my invention:

1. A system for transmitting power and motion comprising: at least two means for transmitting power and motion, a first means and a second means, wherein said first means comprises a linear alternating aliphatic polyketone polymer and communicates power and motion directly to said second means comprising a linear alternating aliphatic polyketone polymer; wherein said system can communicate power and motion to the point of breakage of said first or said second means; wherein said polymer of which said first and second means are comprised is not reinforced and wherein at least two of said means are gears.

2. The system of claim 1 comprising gears and parallel shafts, wherein at least one of said gears is affixed to at least one of said parallel shafts; at least another of said gears is affixed to another of said parallel shafts; power and motion being transmitted between said gears.

3. The system of claim 1 wherein said gears are spur gears.

4. The system of claim 1 comprising gears and intersecting shafts, wherein at least one of said gears is affixed to at least one of said intersecting shafts; at least another of said gears is affixed to another of said intersecting shafts; power and motion being transmitted between said gears.

5. The system of claim 1 wherein for a given application of force, motion can be transmitted between each of said at least two means for transmitting power up to the point of breakage of at least one gear tooth of said at least two means for transmitting power when such system is operated below 85 degrees C.

6. The system of claim 5 wherein said at least two means for transmitting power comprise gears and non-intersecting and non-parallel shafts, wherein at least one of said gears is affixed to at least one of said shafts; at least another of said gears is affixed to another of said shafts; power and motion being transmitted between said gears.

* * * * *